May 31, 1960 W. E. BELL 2,939,072
MAGNETOABSORPTION METHOD AND APPARATUS FOR MODULATION
Filed May 14, 1956

INVENTOR.
William E. Bell
BY
Paul D. Hunter
Attorney

United States Patent Office 2,939,072
Patented May 31, 1960

2,939,072
MAGNETOABSORPTION METHOD AND APPARATUS FOR MODULATION

William E. Bell, Palo Alto, Calif., assignor to Varian Associates, San Carlos, Calif., a corporation of California Filed May 14, 1956, Ser. No. 584,644

16 Claims. (Cl. 324—34)

This invention relates in general to a novel fundamental system of modulation and more particularly to such a system utilizing the principle of magnetoabsorption for translating minute motions into measurable electrical quantities.

The general principle of magnetoabsorption, that is the absorption of energy from a high frequency energy source by a material such as ferromagnetic or paramagnetic as a function of the changing magnetism of the material, is described in United States patent application Serial No. 523,738 filed by the present applicant on July 22, 1955 entitled "Magnetoabsorption Method and Apparatus" now U.S. Patent 2,909,725, issued October 20, 1959. The present invention utilizes this property to produce a novel modulation system in which minute motions, so small as to be practically undetectable to any degree of certainty by any known system, are converted, through magnetoabsorption, into measurable electrical characteristics such as the change in an electrical potential.

It is, therefore, the principal object of the present invention to provide a novel method and apparatus utilizing the principle of magnetoabsorption for translating minute physical motions into measurable electrical properties.

One feature of the present invention is the provision of a novel magnetoabsorption system in which the motion of a magnetized object is detected by the effect the motion of the object produces in the source of a radio frequency energy coupled to the object.

Another feature of the present invention is the provision of a novel magnetoabsorption system in which small variations or movements in the position of a magnetic object are converted by magnetoabsorption into easily measured changes in the characteristics of a radio frequency source.

Still another feature of the present invention is the provision of a novel measuring device utilizing the principle of magnetoabsorption for use in pressure gauges, accelerometers, position stabilizers, weighing devices, and similar type measuring instruments.

Figure 1:
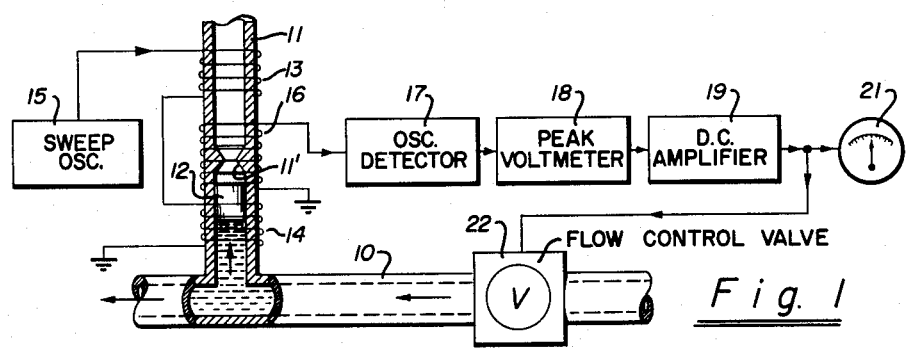
Figure 2:
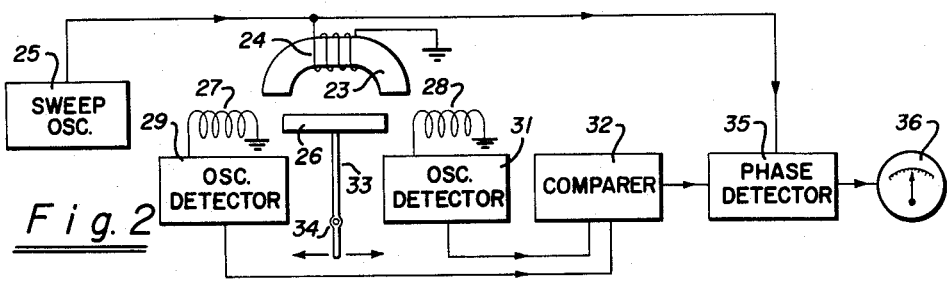
Figure 3:
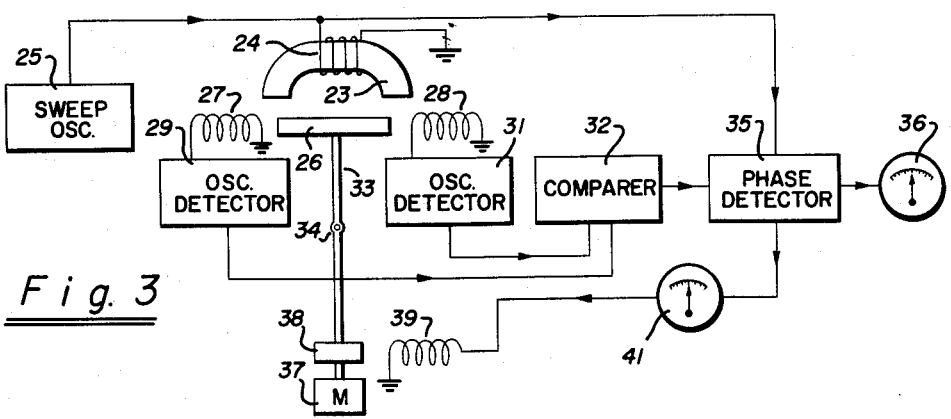
Figure 4:
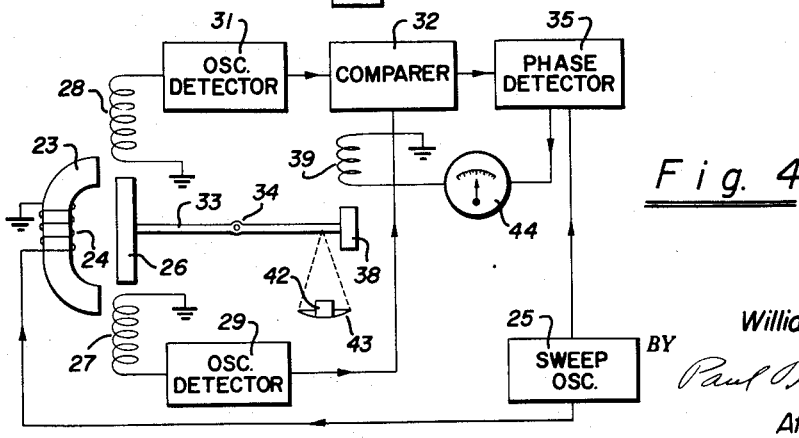

These and other features and advantages of the present invention will become apparent from a perusal of the following specification taken in connection with the drawings wherein, Fig. 1 is a block diagram of a novel magnetoabsorption pressure gauge and fluid flow control system, Fig. 2 is a block diagram of another magnetoabsorption system for accurately measuring minute motions, Fig. 3 is a block diagram of still another magnetoabsorption system similar to that of Fig. 2 in which a feedback control is used to maintain a null balancing condition, and Fig. 4 is a block diagram of a novel magnetoabsorption system for accurately weighing objects.

Referring now to Fig. 1 there is shown a fluid flow conduit 10 of, for example, glass adapted to carry liquid or gas under pressure. The conduit 10 is provided with a vertical branch stub conduit 11 which contains a slideable member or float 12 of suitable magnetoabsorption material, such as a ferromagnetic material, the float being adapted to move or float up and down in the vertical stub 11 in response to the pressure of the liquid or gas flowing in the conduit 10. Encircling the vertical stub 11 and axially coinciding therewith are shown two sweep coils 13 and 14 which are serially connected to an oscillator circuit 15. This oscillator circuit 15 is adapted to produce an audio sweep frequency of, for example, 60 cycles for producing a 60 cycle sweep field enveloping the float member 12. Also encircling the vertical stub 11 in axial alignment with the sweep coils 13 and 14 is a radio frequency coil 16 which is coupled to the output of an oscillating detector circuit 17. This oscillating detector may be, for example, one producing a radio frequency of about 1 megacycle and the radio frequency coil 16 may be the tank coil which forms a part of the oscillator tuning circuit.

As is well-known in the electronic art, the oscillating detector 17 is a high frequency producing device which is extremely sensitive to any changes in the amount of energy absorbed from the oscillator coil 16. In accordance with the magnetoabsorption principle set forth in the above-cited patent application, the ferromagnetic material of the float 12 absorbs energy from the coil 16 of the oscillating detector as a function of the changing magnetism of the float 12 induced by the electromagnetic sweep field from the coils 13, 14. The output of the oscillating detector 17 is the envelope of the 60 cycle modulated radio frequency. A peak voltmeter 18 coupled to the output of oscillating detector 17 will record the peak amplitude of the signal output. Minute vertical movements of the float 12 relative to the radio frequency coil 16 will produce detectable changes in the peak voltage output as measured by the peak voltmeter 18. For example, as the float moves closer to the radio frequency coil 16, the float absorbs a larger amount of energy from the receiver coil due to magnetoabsorption and this increased absorption is denoted by a decrease in the amplitude of the oscillator detector output which, of course, results in a decrease in the peak voltage measured. Since the float 12 moves closer to or further from the radio frequency coil 16 in direct relationship to the pressure of the gas or liquid in the conduit 10, the signal output of the peak voltmeter 18 is inversely proportional to the pressure in the system. The output from the peak voltmeter 18 may be suitably amplified by a D.C. amplifier 19 and then transmitted to a meter device 21, if desired, which will visually indicate the exact pressure in the flowing system. If desired, the output from the D.C. amplifier 19 may be coupled to an electronically controlled flow valve 22 located in the system, the valve 22 operating in response to the signal output from the D.C. amplifier for suitably controlling the flow in the conduit 10 so that the pressure therein will remain at a constant fixed value. Since the maximum magnetoabsorption effect is obtained when the float 12 is in the area slightly outside of or just within the radio frequency coil 16, the vertical stub 11 is shown provided with slight indentations 11' to prevent the float 12 from passing through the radio frequency coil and for limiting the float to the most sensitive region.

Referring now to Fig. 2, there is shown an ultramicrometer system utilizing magnetoabsorption principles for detecting extremely small motions of a body as of magnetoabsorption material. A U-shaped magnet 23 is shown having a sweep coil 24 wound thereupon, the sweep coil 24 being coupled to the output of an audio sweep oscillator 25. A sweeping magnetic field is thus produced in a bar 26 of magnetoabsorption material such as, for example, ferromagnetic, located within the lines of force from the magnet 23. A pair of radio frequency coils 27 and 28 are positioned an equal distance from opposite ends of the ferromagnetic bar 26, each coil being the coil of a tuned circuit of an associated oscillating detector circuit 29–31. The energy absorbed from the oscillating detectors 29 and 31 by the ferromagnetic bar 26 due to magnetoabsorption is a direct function of the distance between the ends of the bar 26 and the respective coils 27 and 28. The outputs from each of the oscillating detectors 29 and 31 are coupled to an electronic comparer circuit 32 in which the signal outputs from the two detectors are compared, the output of the comparer circuit 32 being a zero voltage when the energies absorbed from each of the oscillating detectors are equal. The energy absorption from each detector 29, 31 will be equal as long as the ferromagnetic bar 26 positioned between the coils 27 and 28 of the oscillating detectors 29 and 31 is an equal distance from each. If the bar 26 should even minutely move closer to one oscillating detector than to the other, for example, in response to a motion applied to the lower end of lever arm 33 which is attached at its upper end to the ferromagnetic bar 26 and is pivoted at point 34, the output from the two detectors would become unequal and there would be resultant voltage output from the comparer circuit 32. The output of the comparer 32 is transmitted to a phase detector 35 which is also coupled to the sweep field oscillator 25. The output of the phase detector 35 is a D.C. voltage, the sign of which is dependent on which of the two coils 27 or 28 the ferromagnetic bar 26 has moved closer to and the amplitude of which is proportional to the distance of movement of the ferromagnetic bar. The output of the phase detector 35 may be coupled to a suitable meter device 36 which gives a visual indication of the direction and the magnitude of the movement. The lower end of the lever 33 could, for example, be coupled to a stylus for measuring the roughness of a surface over which the stylus moves or could be coupled to any other object which one desires to test for minute movements.

Referring now to Fig. 3 there is shown a system similar to that shown in Fig. 2 in which the novel modulation scheme may be utilized as an accelerometer for measuring the value of acceleration or G of a mass. Apparatus in Fig. 3 (and also in Fig. 4) which are similar to those in Fig. 2 bear like reference numerals. The lever arm 33 has a mass 37 connected on the lower end thereof and has also mounted thereon a small permanent bar magnet 38. A coil 39 is positioned near and in alignment with the permanent magnet 38 so that magnetic field produced by current flow in the coil 39 will either attract or repel the magnet 38 depending on the direction of current flow in the coil. The output from the phase detector 35 is coupled through an electrical current meter 41 to the coil 39. With the magneto-absorption bar 26 positioned midway between the oscillating detector coils 27 and 28, the output from the phase detector 35 is zero and thus no attracting or repelling field is produced by the coil 39. Now when a force acts on the mass M so as to accelerate it either to the right or to the left as seen in Fig. 3, the magnetoabsorption bar 26 moves toward one or the other of the coils 27 and 28 dependent on the direction of movement of the mass 37. Movement of the bar 26 results in an output current from the phase detector, the amplitude of this current being dependent on the distance of movement of the bar 26 and the sense of the current being dependent upon which of the coils 27 and 28 the bar 26 moves toward. This output current from the phase detector flows through the coil 39 thus resulting in the production of an attracting or repelling magnetizing force exerted on the permanent magnet 38 in a direction which tends to offset the movement of the mass 37. In this manner, a current is produced which is of a value proportional to the acceleration of the mass 37 and which has a sense dependent on the direction of the acceleration. This current amplitude and sense is registered on the current meter 41 which is calibrated in acceleration units or G. Thus this feedback or servo-type system acts at all times to offset the acceleration forces on the lever 33 and to produce accurate acceleration readings on the meter 41.

A similar type of magnetoabsorption servo-control system as seen in Fig. 4 may be employed to produce a very precise weighing device in which objects, such as 42, to be weighed are placed in scale 43 and tend to depress the right hand end of lever 33, this movement being offset by attraction magnetic forces produced by the current in the winding 39 as a result of the movement of magnetoabsorption bar 26. The attraction magnetic field acts on the permanent bar magnet 38 for opposing the movement of the lever due to the object 42. These proportional current values in winding 39 register on a meter, such as 44, the weight of the object 42 seeking to displace the lever 33 and move the bar 26.

As stated in the above cited patent application, systems other than those employing an oscillating detector may be employed by those skilled in the art to detect the magnetoabsorption affect, such as balancing bridge techniques or any like device which will accurately measure the Q of a radio frequency coil. Also, it may be desirable to detect the magnetoabsorption by detecting the frequency change in a radio frequency source rather than a change in the amplitude of an output signal from the oscillating detector.

Since many changes may be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Fluid flow pressure measuring apparatus comprising a conduit for carrying the flowing fluid including a vertical stub portion, a float of magnetizable material located in said stub and adapted to float therein and move in response to the pressure variations in said fluid flow, means associated with said vertical stub for inducing a cyclically varying magnetic field in said magnetizable float, a radio frequency energy source associated with said vertical stub and inductively coupled to said float for applying a radio frequency magnetic field to the float simultaneously with the changing magnetic field whereby the degree of inductive coupling between said radio frequency source and said float varies as a function of the position of the float relative to the radio frequency source, and means for detecting the absorption of energy from the radio frequency source as a function of the changing magnetism in the float, variations in the characteristics of said absorption indicating the relative movement of the float in the vertical stub portion.

2. Fluid flow apparatus as claimed in claim 1 including means for regulating the fluid flow through the conduit and means coupling said detecting means to said control means for controlling said regulating means in response to the relative movement of the float in the vertical stub portion.

3. Fluid flow apparatus as claimed in claim 1 wherein said means for inducing a changing magnetic field in said magnetizable float comprises an audio sweep generator and an inductance coil coupled to said float and wherein said radio frequency energy source comprises an oscillating detector and a radio frequency coil coupled to said float and wherein said means for detecting the absorption of energy from the oscillating detector comprises a peak voltmeter coupled to the oscillating detector and a D.C. amplifier coupled to the output of said peak voltmeter, the voltage output of said D.C. amplifier having an amplitude which is dependent on the position of the float relative to the radio frequency coil.

4. A minute motion detector comprising a magnetizable body movable in response to external forces acting upon the body, means coupled to said body for inducing a cyclically varying magnetism in the body, a plurality of radio frequency sources located at different positions relative to said body and inductively coupled to said body, each of said sources supplying a radio frequency magnetic field to said body simultaneously with the cyclically varying magnetic field, and means for detecting the absorption of energy by the body from each of the radio frequency sources as a function of the cyclically varying magnetism, variations in the characteristics of the absorption indicating the position of the body relative to each radio frequency source, increased absorption from one source over the absorption from another source indicating the positon of the body as closer to said one source than to said other source.

5. Apparatus as claimed in claim 4 wherein said radio frequency sources are coupled to a means for comparing the absorption from the two sources and producing a voltage output which is dependent in sense and amplitude on the direction and distance of movement of the body relative to the two sources, and means coupled to said comparer circuit and controlled by said output voltage for physically moving the body to a desired position relative to the radio frequency sources.

6. Apparatus as claimed in claim 5 wherein said means for producing a changing magnetism in the body comprises a sweep generator and a sweep coil, said coil being inductively coupled to said body and wherein each of said radio frequency sources comprises an oscillating detector including a radio frequency coil coupled to said body.

7. Apparatus as claimed in claim 6 including a comparer circuit coupled to each of said oscillating detectors for comparing the different absorptions from each of the oscillating detectors and a phase detector coupled to the output of said comparer circuit and also coupled to the sweep generator, the output of said phase detector being an electrical potential, the sense of which is proportional to the direction and the amplitude of which is proportional to the distance of movement of the body relative to the oscillating detector coils.

8. Apparatus as claimed in claim 4 for use in an accelerometer including a mass subject to the forces of acceleration to be measured coupled to the magnetoabsorption body and producing movement of said body in accordance with the acceleration forces on said mass.

9. Apparatus as claimed in claim 8 including a servo system operative in response to the change in magnetoabsorption produced by the movement of the magnetoabsorption body including means coupled to the magnetoabsorption body for producing movement of said magnetoabsorption body in a direction to offset the acceleration-induced movement.

10. Apparatus as claimed in claim 4 for use in a weight measuring device including a scale coupled to said magnetoabsorption body and adapted to hold the matter to be weighed, movements of said scale due to the weight of said matter producing movement of said magnetoabsorption body.

11. Apparatus as claimed in claim 10 including a servo system operative in response to the change in magnetoabsorption produced by the movement of the magnetoabsorption body including means coupled to the magnetoabsorption body for producing movement of said magnetoabsorption body in a direction to offset the movement produced by the weighty matter in said scale.

12. A minute motion detector comprising a magnetizable body movable in response to external forces acting upon the body, means coupled to said body for inducing a cyclically varying magnetic field in the body, a radio frequency energy source inductively coupled to the body for applying a radio frequency magnetic field to the body simultaneously with the cyclically varying magnetic field, means for positioning said magnetizable body at variable positions relative to said radio frequency source whereby the degree of inductive coupling between said radio frequency source and said body varies as a function of the position of the body relative to the radio frequency source, and means for detecting changes in the energy level of the radio frequency source as a function of the cyclically varying magnetism of the body, variations in the characteristics of said energy changes indicating movement of said body relative to the radio frequency energy source whereby the degree of coupling is varied.

13. A minute motion detector as claimed in claim 12 wherein said cyclically varying magnetic field means comprises a sweep generator and an induction coil coupled thereto and wherein said radio frequency energy source and detecting means comprises a second induction coil and an oscillating detector system, said body being mounted so as to be inductively coupled to both of said coils.

14. A minute motion detector comprising a magnetizable body, means including a sweep generator for producing a cyclically varying magnetic field enveloping the body and producing cyclically varying magnetism thereof, a radio frequency energy source including an oscillating detector inductively coupled to the body for applying a radio frequency magnetic field to the body simultaneously with the cyclically varying magnetic field, said oscillating detector having energy absorbed therefrom as a function of the cyclically varying magnetism in the body, means for positioning said magnetizable body at variable positions relative to said radio frequency source whereby the degree of inductive coupling between said radio frequency source and said body varies as a function of the position of the body relative to the radio frequency source, and means coupled to said oscillating detector for indicating the energy absorbed therefrom, variations in the characteristics of said absorption indicating minute relative movement between the body and said radio frequency applying means resulting in changes in inductive coupling between the body and the radio frequency means.

15. Apparatus as claimed in claim 14 wherein an audio sweep coil is coupled to said sweep generator and utilized to induce the cyclically varying magnetism in the body and wherein a radio frequency coil is coupled to said oscillating detector for inducing the radio frequency energy in said body, the changes in the absorption of energy indicating a relative movement between the body and said radio frequency coil.

16. Apparatus as claimed in claim 14 wherein said means coupled to said oscillating detector for indicating the absorption of energy comprises a peak voltmeter and a D.C. amplifier coupled to the output of said peak voltmeter, the voltage output of said D.C. amplifier having an amplitude which is dependent on the position of the body relative to the radio frequency coil.

References Cited in the file of this patent

UNITED STATES PATENTS

| | | |
|---|---|---|
| Re. 24,267 | Ostermann | Jan. 22, 1957 |
| 2,417,292 | Coake | Mar. 11, 1947 |
| 2,448,794 | Goldsmith et al. | Sept. 7, 1948 |
| 2,487,523 | Coake | Nov. 8, 1949 |
| 2,564,777 | Cavanagh | Aug. 21, 1951 |
| 2,602,660 | Shannon | July 8, 1952 |
| 2,631,027 | Payne | Mar. 10, 1953 |
| 2,663,867 | Favara et al. | Dec. 22, 1953 |

FOREIGN PATENTS

| | | |
|---|---|---|
| 600,915 | Great Britain | Apr. 22, 1948 |